United States Patent [19]
Golden et al.

[11] Patent Number: 6,093,379
[45] Date of Patent: *Jul. 25, 2000

[54] PURIFICATION OF GASES

[75] Inventors: Timothy Christopher Golden, Allentown; Alexander Schwarz, Bethlehem; Thomas Hsiao-Ling Hsiung, Emmaus; Fred William Taylor, Coplay, all of Pa.

[73] Assignee: Air Products and Chemicals, Inc., Allentown, Pa.

[*] Notice: This patent is subject to a terminal disclaimer.

[21] Appl. No.: 09/206,184

[22] Filed: Dec. 4, 1998

[51] Int. Cl.⁷ .................................................. B01D 53/00
[52] U.S. Cl. .................. 423/230; 423/247; 423/248; 423/437.2; 95/117; 95/139; 95/140
[58] Field of Search ............................. 95/139, 140, 117; 423/248, 247, 437.2, 230

[56] References Cited

U.S. PATENT DOCUMENTS

| | | | |
|---|---|---|---|
| 3,672,824 | 6/1972 | Tamura et al. | 23/4 |
| 3,758,666 | 9/1973 | Frevel et al. | 423/247 |
| 4,019,879 | 4/1977 | Rabo et al. | 55/68 |
| 4,019,880 | 4/1977 | Rabo et al. | 55/68 |
| 4,579,723 | 4/1986 | Weltmer et al. | 423/219 |
| 4,713,224 | 12/1987 | Tamhankar et al. | 423/219 |
| 4,944,273 | 7/1990 | Baresel et al. | 123/440 |
| 5,110,569 | 5/1992 | Jain | 423/230 |
| 5,478,534 | 12/1995 | Louise et al. | 422/188 |
| 5,914,455 | 6/1999 | Jain et al. | 95/96 |

FOREIGN PATENT DOCUMENTS

| | | | |
|---|---|---|---|
| 0 612 554 A1 | 8/1994 | European Pat. Off. | 95/139 |
| 2739304A1 | 4/1997 | France | B01D 53/75 |

OTHER PUBLICATIONS

Forster, et al., "Spectroscopic investigations on sorption and oxidation of carbon monoxide in transition metal ion–exchanged zeolites A: Studies on cobalt, nickel and copper forms" *Zeolites*, 1987, vol. 7, Nov 517–521.

Anderson, H. C. and Green, W. J., *Ind. Eng. Chem.*vol. 53, No. 8, pp. 645–646, Aug. 1961 "Removing Carbon Monoxide from Ammonia Synthesis Gas".

*Primary Examiner*—Steven P. Griffin
*Assistant Examiner*—Timothy C Vanoy
*Attorney, Agent, or Firm*—Geoffrey L. Chase

[57] ABSTRACT

Carbon dioxide, water, carbon monoxide and hydrogen are removed from a gas stream such as air or nitrogen by adsorbing water and carbon dioxide on a solid absorbent of alumina, or zeolite and oxiding carbon monoxide over a solid catalyst to carbon dioxide and adsorbing the resulting carbon dioxide and chemisorbing the hydrogen on the catalyst, which may be palladium on alumina.

6 Claims, 1 Drawing Sheet

PURIFICATION OF GASES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the removal of carbon monoxide and hydrogen from air or nitrogen for the production of high purity nitrogen gas.

In many chemical processes, CO and $H_2$ are undesired species because of their chemical reactivity. For example, the electronics industry requires high purity $N_2$ (less than 5 parts per billion by vol., $ppb_v$, CO and $H_2$) for the production of semiconductor materials. Impurities present in the $N_2$ during formation of the silicon wafers greatly increase chip failure rates. When air is subjected to cryogenic separation to produce $N_2$, since $N_2$ and CO have similar boiling points, CO present in the feed air to the cryogenic column is substantially unaffected by the distillation process. If no special provisions are taken to the distillation process, hydrogen enriches in the product $N_2$ to approximately two and a half times its concentration in the feed air. Therefore, the production of high purity $N_2$, i.e. CO and $H_2$-free $N_2$ for the electronics industry requires either 1) removal of CO and $H_2$ from ambient air prior to the distillation column or 2) post-treatment of the product $N_2$. Often times, electronics customers require both pre- and post-treatment for added system reliability.

The current techniques for trace CO and $H_2$ removal involve catalytic conversion of CO to $CO_2$ and $H_2$ to water with subsequent removal of $CO_2$ and water impurities.

In the conventional process for cryogenic separation of air to recover $N_2$ and $O_2$, feed air is compressed, then cooled to low temperature before introduction to a two stage distillation column. Unless water and $CO_2$ are removed from the air before compression, these components will block heat exchangers employed for cooling the gas prior to distillation. The principal method for such removal is thermal swing adsorption (TSA) on molecular sieve. In the TSA system for $CO_2$ and water removal, atmospheric air is compressed to about 100 psig (690 Kpa g) followed by water cooling and removal of the thus condensed water. Then the air, which is then about 100° F. (38° C.), can be further cooled to 40° F. (4.5° C.) using refrigerated ethylene glycol. The bulk of the water is removed in this step by condensation and separation of the condensate. The gas is then passed to a molecular sieve bed or mixed alumina/molecular sieve bed system where the remaining water and $CO_2$ are removed by adsorption. The sorbent beds are operated in a thermal swing mode with equal periods, such as four hours (maybe as long as 24 hours), being devoted to adsorption and to regeneration. By using two beds, one is operated for adsorption while the other is being regenerated and their roles are periodically reversed in the operating cycle. During the regeneration, part of the product gas ($N_2$) or waste stream from the cold box is slightly compressed with a blower and heated to about 260° C. The hot gas is passed through the bed being regenerated, perhaps for two hours, following which the regeneration gas is cooled to typically 4.5° C. for the final two hours, so cooling the bed to that temperature. Regeneration is carried out in a direction counter to that of the adsorption step.

Alternatively, a pressure swing adsorption (PSA) system may be used. In this case, cycle times are shorter (feed steps are 5–30 minutes), but feed temperature, pressure and regeneration gas remains the same. In the case of PSA, the regeneration gas is not heated.

Such a system is effective for the removal of $CO_2$, water and $C_3$, hydrocarbons from atmospheric air. However, conventional molecular sieve beds are not effective for the removal of CO or $H_2$. The main conventional technique currently used to produce CO-free $N_2$ includes oxidation of CO present in the ambient air to $CO_2$ prior to feeding to the molecular sieve system. This additional catalytic conversion system adds to capital and operating costs of a standard $N_2$ plant. Alternatively, such CO removal steps may be applied to the nitrogen obtained after the air separation process.

In one known method, CO is removed from nitrogen using a Ni on alumina catalyst. The principle disadvantages with this material are high cost, the need for activation in reducing gas and the pyrophoric nature of the activated material. Good adsorbents for trace CO removal should preferably be less expensive, easily regenerable and not pyrophoric.

The oxidation of CO to $CO_2$ and $H_2$ to $H_2O$ in the presence of $O_2$ occurs readily at high temperatures (above 500° C.). These reactions can be carried out at lower temperature, about 150° C., in the presence of noble metal catalysts based on palladium or platinum (Anderson, H. C. and Green, W. J., Ind. Eng. Chem., 53, 645, 1961). This technique is currently used as a pre-treatment step for ambient air prior to the front-end adsorption system for $CO_2$ and water removal on a cryogenic air plant. The main disadvantages of this removal technique include 1) high cost of noble metal catalysts, 2) the need to heat the air prior introduction to the catalyst bed, 3) an extra bed and increased plot space is required and 4) the added system pressure drop increases the power requirements of the system.

Ambient temperature processes for the removal of trace impurities from inert gases are also known in the art. U.S. Pat. No. 4,579,723 discloses passing an inert gas stream through a catalyst bed containing a mixture of chromium and platinum on gamma alumina followed by a second bed composed of gamma alumina coated with a mixture of several metals. These beds both convert CO to $CO_2$ and $H_2$ to water and adsorb the resulting impurities to form a high purity product (less than 1 part per million, ppm).

U.S. Pat. No. 4,713,224 teaches a one step process for the purifying gases containing trace quantities of CO, $CO_2$, $O_2$, $H_2$ and $H_2O$ in which the gas stream is passed over a material comprising elemental nickel and having a large surface area. If there is oxygen present, CO is oxidised to $CO_2$, otherwise it is adsorbed. The specification is rather vague as regards the nature of the substrate on which the nickel is supported, referring to it merely as a 'silica-based substrate'.

Processes for the ambient temperature oxidation of CO to $CO_2$ are given in U.S. Pat. Nos. 3,672,824 and 3,758,666.

It is suggested in U.S. Pat. No. 4,944,273 that CO can be selectively adsorbed by zeolites doped with metals such as Ca, Co, Ni, Fe, Cu, Ag, Pt, or Ru. Based on this property, it is proposed there to use such doped zeolites in CO sensors, e.g. for use in sensors monitoring automobile exhaust gas systems. However, no demonstration of selectivity is shown in that specification. Also, the highest capacity for adsorbing CO demonstrated is in connection with the Na form of zeolite ZSM 8 and no CO adsorption is shown when the Co form of ZSM 5 or the Ru form of ZSM 8 are tested. Since the units in which adsorption was measured appear to be mis-stated, it is impossible to tell what adsorption capacity in absolute terms these adsorbents were found to have. However, for the purposes of U.S. Pat. No. 4,944,273 it would appear to be the change in electrical properties on exposure to CO that the zeolite exhibits that is important rather than adsorption capacity.

U.S. Pat. No. 4019879 discloses the use of a zeolite containing CuU ions for adsorbing CO selectively. However, the CO is recovered for use as a reagent from gas streams containing large concentrations of it and there is no indication that such an adsorbent would be effective to remove ppm levels of CO from a gas stream.

U.S. Pat. No. 4,019,880 describes the adsorption of CO on zeolites containing silver cations. The CO concentration can be reduced below as little as 10 ppm CO.

Forster et al, 'Spectroscopic investigations on sorption and oxidation of carbon monoxide in transition metal ion-exchanged zeolites A: Studies on cobalt, nickel and copper forms' Zeolites, 1987, Vol. 7, Nov 517–521, discusses the adsorption of CO on the zeolites referred to in its title. Capacity for adsorption at low ppm levels is not discussed.

U.S. Pat. No. 5,110,569 teaches a process for removing trace quantities of carbon monoxide and hydrogen from an air stream along with larger quantities of carbon dioxide and water as a prelude to cryogenic distillation. The process is conducted by TSA or PSA using a three layer adsorption bed having a first layer for adsorbing water (suitably alumina, silica gel, zeolite or combinations thereof, a second layer of catalyst for converting carbon monoxide to carbon dioxide (suitably nickel oxide or a mixture of manganese and copper oxides) and a third layer for adsorbing carbon dioxide and water (suitably zeolite, activated alumina or silica gel). The second layer may include a catalyst for converting hydrogen to water and this may be supported palladium.

Thus in summary, U.S. Pat. No. 5,110,569 teaches a process for removing CO, $CO_2$ $H_2O$ and optionally $H_2$ from a feed stream (particularly air) comprising 1) initially removing water and carbon dioxide, 2) catalytic oxidation of CO to $CO_2$ and $H_2$ to $H_2O$ and 3) removing the oxidation products. The resulting gas stream may then be purified by cryogenic distillation.

It is not disclosed that any catalyst is capable of both oxidising carbon monoxide to carbon dioxide and adsorbing the carbon dioxide produced, thereby forming a dual catalyst/adsorbent. It is also not apparently the intention that the carbon dioxide present initially should be adsorbed prior to the oxidation of the carbon monoxide.

In FR 2739304, carbon monoxide is first oxidised to carbon dioxide and the carbon dioxide produced together with carbon dioxide and water present initially are then adsorbed using conventional adsorbents. Thereafter, hydrogen is adsorbed on palladium supported on alumina. Metals that can be used in place of palladium are Os, Ir, Rh, Ru, and Pt. It is stated that hydrogen is not oxidised under these conditions. This casts doubt on whether U.S. Pat. No. 5,110,569 is correct in stating that hydrogen can be oxidised at ambient temperature on supported palladium or other precious metals.

None of these prior art teachings therefore disclose the ability of the adsorbents discussed to remove CO from a gas stream down to ppb levels. In addition, there is no prior art teaching for trace CO and $H_2$ removal from air in which a single material can simultaneously 1) convert CO present in air to $CO_2$ at ambient temperature, 2) adsorb the $CO_2$ thereby produced, and 3) chemisorb $H_2$. Thus, CO and $H_2$ are removed in a single material in the presence of each other and by different mechanisms.

We have now found that by simply adding a layer of a suitable dual catalyst/adsorbent to a conventional adsorbent bed for the removal of carbon dioxide and water, carbon monoxide present initially in trace amounts can be oxidised to carbon dioxide and adsorbed on the same catalyst material, while $H_2$ is chemisorbed on the same material, thus advantageously simplifying past proposals in a surprising but effective manner.

BRIEF SUMMARY OF THE INVENTION

The present invention accordingly provides a process for the removal of carbon dioxide, water, carbon monoxide and hydrogen from a gas stream to produce a purified gas stream, comprising:

adsorbing water and carbon dioxide on a solid adsorbent, and converting carbon monoxide to carbon dioxide over a solid catalyst and adsorbing the carbon dioxide so formed onto the same catalyst and chemisorbing $H_2$ on the same catalyst.

The catalyst is preferably a supported precious metal, e.g. Pd, Os, Ir, Rh, Ru, Ag, Au, Re or Pt, preferably supported on alumina, silica or zeolites. Most preferably, the catalyst is palladium supported on alumina. We have surprisingly established that supported palladium has a useful capacity for carbon dioxide adsorption and that it is capable of oxidising carbon monoxide and chemisorbing hydrogen in the presence of each other.

As indicated above, the gas stream may be of air which is to be separated into oxygen and nitrogen to produce a stream of nitrogen free from carbon monoxide and optionally also from hydrogen down to ppb levels. This method of operation is referred to as the 'pre-treatment mode.' Alternatively, it may be a stream of nitrogen produced in an air separation unit and then subjected to purification. This is referred to as the 'post-treatment mode.'

The pre-treatment mode allows the air feed to the cryogenic column to be free of $CO_2$, $H_2O$, $H_2$ and CO. The distillation column is then capable of producing high purity $N_2$.

The starting level of CO will generally be only a trace amount (up to 25 ppm). The final levels of CO is preferably no more than 5 ppb, preferably below 3 ppb, most preferably no more than 1 ppb of CO.

Processes according to the invention may be operated by TSA or PSA or variants thereof. In TSA, adsorbent regeneration is accomplished by pressure reduction followed by countercurrent purge with hot gas. In PSA, adsorbent regeneration is generally accomplished by pressure reduction followed by countercurrent purge with ambient temperature gas.

Feed temperatures may be from 5 to 40° C. with feed pressures of 2 to 15 atmospheres. For TSA systems, typical regeneration temperatures are 100 to 400° C. Regeneration gas can consist of $N_2$, $O_2$, Ar, He, air and mixtures thereof.

In a typical preferred embodiment, the feed to the system would be ambient air and the regeneration flow would consist of either product $N_2$ or more desirably waste effluent from the N2 plant (60% $O_2$/40% $N_2$).

BRIEF DESCRIPTION OF SEVERAL VIEWS OF THE DRAWING

The invention will be further illustrated by the following description of preferred embodiments with reference to the accompanying drawing, in which.

DETAILED DESCRIPTION OF THE INVENTION

Figure 1:
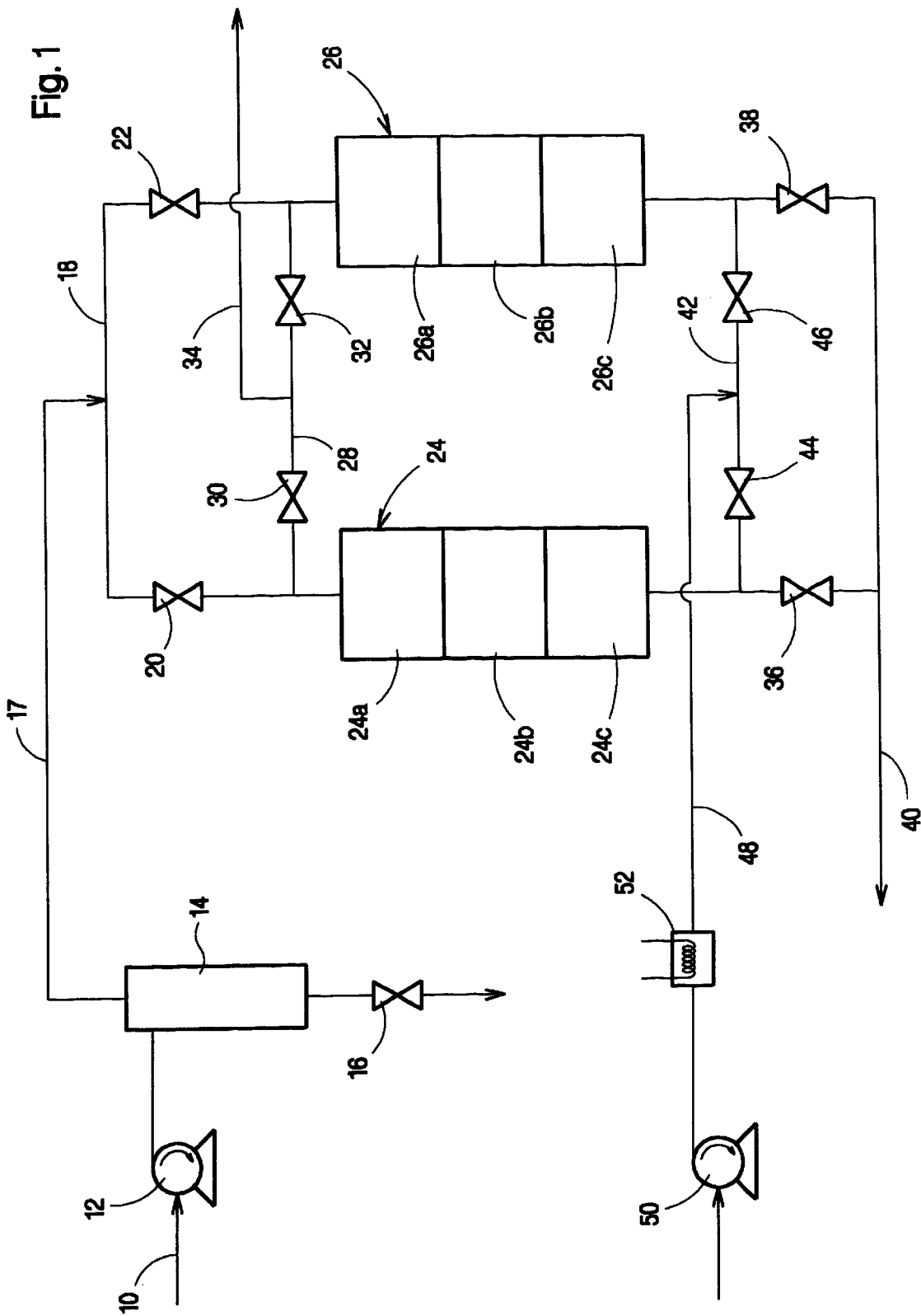
FIG. 1 is a schematic diagram of apparatus for use according to a first embodiment of the invention.

As shown in FIG. 1, apparatus for use according to the invention comprises an inlet 10 for a gas stream (which in this case is air) leading to a main air compressor 12. Compressed air produced by the main air compressor 12 passes to a cooler 14 in which some of the water present in the air is condensed out and exits via drain valve 16.

The cooled, partially dried air passes via a line 17 to a purification section of the apparatus which in the illustrated case operates by TSA. It should be appreciated however that this section of the apparatus can be designed to operate by PSA or any of the variants of TSA and PSA known in the art.

Air is received from line 17 into an inlet manifold 18 containing valves 20,22, which connect line 18 to respective adsorption vessels 24,26. Downstream of valves 20,22, the manifold comprises a bridge line 28 containing valves 30,32 by which the vessels 24,26 may respectively be connected to a vent to waste line 34.

The down stream ends of the vessels 24,26 are connected to an outlet manifold comprising valves 36,38 by which the respective vessels are connected to a product outlet line 40. Upstream of the valves 36,38, the manifold comprises a bridge line 42 containing valves 44,46 by which the respective vessels can be connected to a purge gas supply line 48, which leads from a supply of purge gas via a compressor 50 and a heater 52 to connect to bridge line 42 between valves 44 and 46. The supply of purge gas may suitably be from nitrogen separated from air purified in the apparatus shown and then subjected to cryogenic distillation or from air purified in the illustrated apparatus before it is subjected to such distillation.

Within each of the vessels 24 and 26 in FIG. 1, there are three layers of adsorbent illustrated. The first two layers are conventional adsorbents for water 24a, 26a and carbon dioxide 24b, 26b. Suitably these are activated alumina and zeolite respectively. However, any suitable adsorbent or adsorbents for water and carbon dioxide removal may be used as known in the art and these two layers may be combined into a single layer of adsorbent.

The third layer illustrated is oxidation catalyst/adsorbent 24c, 26c, preferably palladium supported on alumina. The carbon monoxide initially present is oxidised and adsorbed in this layer. The hydrogen originally present is chemisorbed. All three layers of the adsorbents are periodically regenerated as described above.

The invention will be further described and illustrated with reference to the following specific examples.

EXAMPLE 1

A PSA purification of air was conducted to demonstrate the ability of an adsorbent/catalyst system to remove trace CO from ambient air. A one inch diameter by 6 feet (183 cm) long adsorption column was filled with 0.3 wt % Pd on alumina. Air with 10 ppm CO was fed to the column at 22° C., 100 psig and a flowrate of 1 SCF/min (0.03 m³/min). The PSA process was run with a molar purge to air (P/A) ratio of 0.3 with a purge pressure of 10 psig (69 kPa). After 100 cycles, the CO concentration in the bed at the end of feed was determined. After reaching steady state operation, it was determined that 1.5 feet (45 cm) of bed was required to convert all the CO to $CO_2$ and subsequently adsorb the $CO_2$ formed. The $CO_2$ concentration at the end of the feed step at 1.5 feet (45 cm) was less than 100 ppb and the CO concentration was undetectable.

EXAMPLE 2

A TSA purification of air in which both $H_2$ and CO are removed from ambient air in a catalytic/adsorptive mode was conducted. A 1.5 inch (3.75 cm) diameter by 9 inch (23 cm) long vessel was filled with 0.5 wt % Pd on alumina. Prior to the start, the catalyst/adsorbent was regenerated in flowing $N_2$ at 150° C. Feed air with 2.7 ppm $H_2$ and 1.8 ppm CO was introduced into the bed at a feed pressure of 94 psig (648 kPa) and a linear velocity of 0.83 ft/sec (25.3cm/sec). It was determined that after 2.2 hours on-stream, $H_2$ breakthrough of 20 ppb and $CO_2$ breakthrough of 100 ppb was measured at the bed outlet. This result shows that a single adsorbent/catalyst can remove both CO and $H_2$ from ambient air. The on-line time for the Pd/alumina is dictated by its $CO_2$ capacity since $CO_2$ breaks through first (slightly ahead of $H_2$).

EXAMPLE 3

Two different Pd/alumina catalysts were tested in the experimental unit and feed conditions described in Example 1. The two catalysts differed in weight loading Pd and degree of basicity as measured by the zero point charge (zpc). This value was determined by placing 2 grams of the catalyst in 20 ml of distilled water (original pH=6.5) and remeasuring the pH of the solution after 30 minutes. The two catalysts were tested in TSA fashion; i.e., the sample was originally regenerated in flowing $N_2$ at 150° C., then the cooled to feed temperature. The feed gas (10 ppm CO in air) was then passed over the catalyst and the concentration of CO and $CO_2$ exiting the column were monitored. The results of testing are shown in Table 1.

TABLE 1

| Catalyst | wt % Pd | zpc | Normalized Time to $CO_2$ Breakthrough |
|---|---|---|---|
| Catalyst A | 0.3% | 9.1 | 1.00 |
| Catalyst B | 0.5% | 6.7 | 0.52 |

In both cases, $CO_2$ was the first impurity to exit the bed. Surprisingly, Catalyst A was on-stream almost two times longer than Catalyst B despite a lower Pd loading. Catalyst A did, however, have a higher (more basic) zero point charge. This example shows the surprising result that the basicity of the catalyst is more important that Pd loading.

The present invention provides a solution to the problem of purifying air of CO and $H_2$ prior to or after cryogenic distillation to generate nitrogen and/or oxygen for electronic and other high purity applications. By catalyzing CO and adsorbing the resulting $CO_2$ and chemisorbing $H_2$ on the same catalyst/adsorbent, the present invention provides enhanced efficiency and reduction in capital requirements for equipment and materials. In addition, the present invention provides an advantageous process for purification which also has a simple energy efficient regeneration for continued utilization in the field.

The present invention has been set forth with regard to several preferred embodiments, however the full scope of the present invention should be ascertained from the claims which follow.

What is claimed is:

1. A process for the removal of carbon dioxide, water, carbon monoxide and hydrogen from a gas stream to produce a purified gas stream, comprising:

adsorbing water and carbon dioxide on a solid adsorbent, and then converting carbon monoxide to carbon dioxide over a single solid catalyst, adsorbing the carbon dioxide so formed onto the same catalyst and chemisorbing $H_2$ onto the same catalyst, wherein said catalyst is a precious metal supported on a support having a zpc (zero point charge) of greater than 8.0.

2. A process as claimed in claim 1, wherein said catalyst is palladium supported on alumina.

3. A process as claimed in claim 1, wherein the carbon monoxide content of the purified gas stream is no more than 5 ppb.

4. A process as claimed in claim 3, wherein said carbon monoxide content is no more than 3 ppb.

5. A process as claimed in claim 1, wherein the hydrogen content of the purified gas stream is no more than 5 ppb.

6. A process as claimed in claim 5, wherein said hydrogen content is no more than 3 ppb.

* * * * *